H. J. HANSEN.
SEAT INDICATOR.
APPLICATION FILED JUNE 8, 1914.
1,185,792. Patented June 6, 1916.
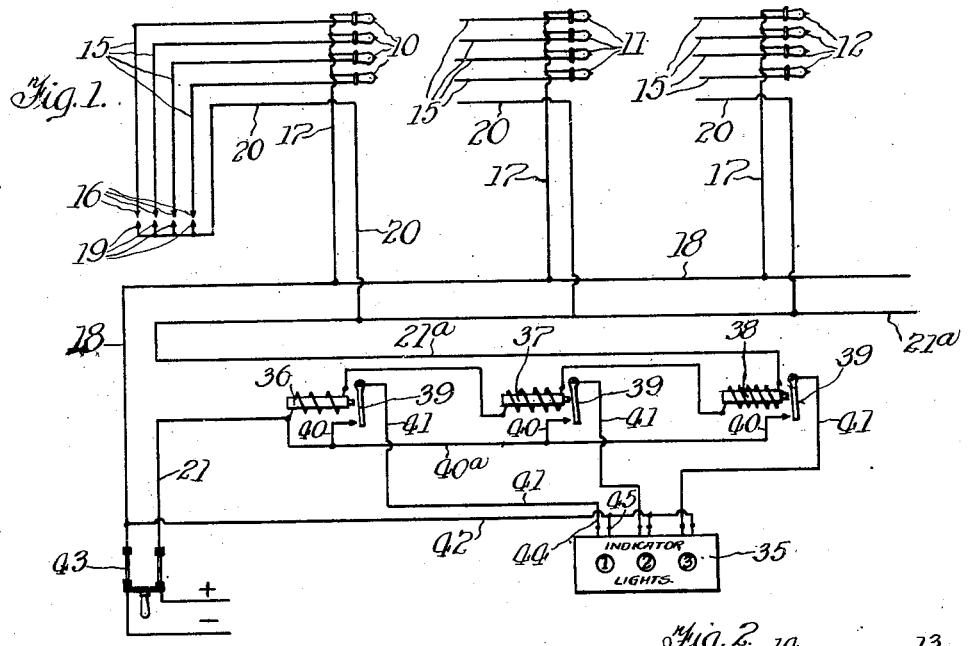
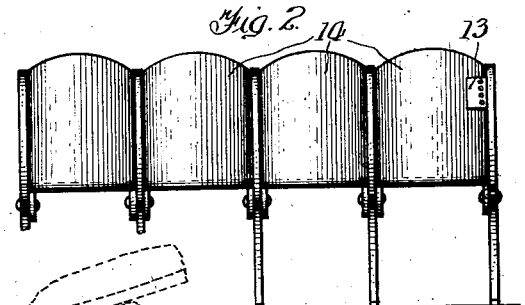
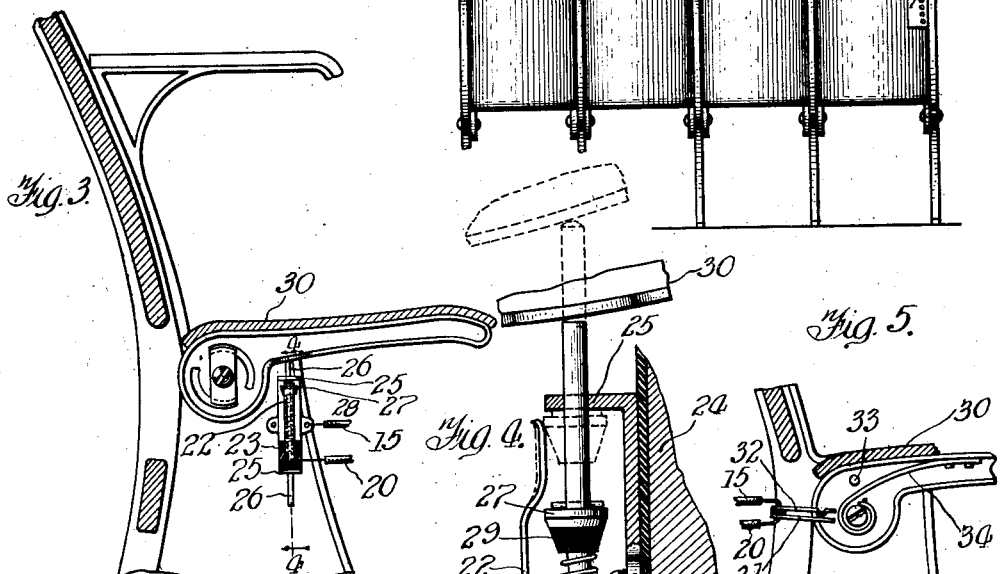
Inventor:
Harris John Hansen,

UNITED STATES PATENT OFFICE.

HARRIS JOHN HANSEN, OF SEATTLE, WASHINGTON, ASSIGNOR OF ONE-THIRD TO H. P. SCHEEL AND WILLIAM McARTHUR, BOTH OF TENINO, WASHINGTON.

SEAT-INDICATOR.

1,185,792.  Specification of Letters Patent.  Patented June 6, 1916.

Application filed June 8, 1914. Serial No. 843,681.

*To all whom it may concern:*

Be it known that I, HARRIS JOHN HANSEN, a citizen of the United States, residing at Seattle, in the county of King and State of Washington, have invented certain new and useful Improvements in Seat-Indicators of which the following is a specification.

This invention relates to improvements in seat indicators, for indicating vacant seats, and one of the objects of the same is to provide an improved device of this character which will electrically indicate just which seats are vacant in predetermined groups or sections of seats without entirely raising the seat or seats.

A further object is to provide an improved device of this character which will automatically operate to electrically display a signal immediately upon the seat becoming vacant, and will operate to conceal or extinguish the signal immediately upon the seat being occupied.

A further object is to provide an improved device of this character, which will not only display a signal to designate just what particular seat or seats are unoccupied, but will also operate a signal to designate in another portion of the house, the number of seats vacant in a predetermined section.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating the invention, and in which—

Figure 1 shows the wiring diagram. Fig. 2 is a view of a number of seats showing the indicator or signal lights applied to the end seat in the row. Fig. 3 is a vertical sectional view of a seat showing a make and break device connected therewith. Fig. 4 is an enlarged sectional view on line 4—4, Fig. 3 and showing the parts in different positions they will assume when the seat is raised and lowered. Fig. 5 is an enlarged sectional view of a portion of a seat showing another make and break device.

Referring more particularly to the drawings, the numerals 10, 11 and 12 designate a series of electric lamps, which are preferably arranged in a housing 13 carried by the end seat of the row of seats 14. The lights 10, 11 and 12 designate the lights of three rows of seats and as these lights all operate in the same manner, the description of the operation of one series of lights will apply equally as well to them all.

Each of the lights 10 has connected with one of its sides a conductor 15, each of which lead to the contact 16 of a make and break device. The other sides of the lamps are connected together by means of a conductor 17 and this conductor 17 is connected with the conductor 18 which leads from one side of the battery or other source of electric power. The other contact devices 19 which coöperate with the contacts 16 are connected to a conductor 20 leading from a conductor 21ª, connected to the other side 21 of the source of power.

The make and break devices 16, 19 may be of any desired construction, but in the form of the invention shown in Figs. 3 and 4, there is provided a contact member 22 which is carried by suitable support 23 mounted upon a fixed portion of the respective seats 24. The support 23 is provided with spaced bearings 25 in which a reciprocating rod 26 is adapted to move and this rod 26 is preferably provided with an enlargement 27, which is adapted to be moved into and out of engagement with the contact 22, when the rod 26 is reciprocated.

An elastic member 28 preferably in the form of a coil spring encircles a portion of the rod 26 and rests against one of the bearings 25 and an insulated portion 29 of the shoulder 27. This elastic member 28 tends normally to move the rod 26 in a direction to cause the shoulder 27 to engage the contact 22 and thereby complete the circuit through the light 10.

The extremity of the rod 26 is arranged in a position that when the seat 30 is lowered, or a weight placed upon the seat, the rod 26 will be depressed against the stress of the elastic member 28, and thereby move the enlargement 27 out of operative relation with the contact 22 and thereby break the circuit through the lamp 10. As soon as the seat 30 is raised, the elastic member 28 will cause the enlargement 27 and the contact 22 to again assume operative relation. The elastic member 28 is of such a strength that as soon as the occupant of the seat rises, the spring will force the seat upwardly a sufficient distance to permit the circuit to be completed through the lamp.

In the form of the invention shown in Fig. 5, the make and break device is of a slightly different construction and comprises spaced contacts 31, 32, corresponding to the contacts 16, 19 and are included in the lamp circuit. The seat 30 is provided with a projection 33 and a spring 34 which tends normally to raise the seat. As soon as the seat is raised, the projection 33 engages the contact 32 and forces it into engagement with the contact 31 to complete the circuit through the lamp. As soon as the seat is lowered the contacts will spring out and thereby break the circuit. Thus it will be manifest that inasmuch as the series of lamps for one entire row of seats, or any portion thereof, are arranged on the outermost seat of the row, it can be readily ascertained by any one walking down the aisle, just which particular seat is vacant in any particular row.

In order to indicate in another portion of the house, the number of seats which are vacant in any predetermined section or area, there is provided an indicator 35, which is arranged in any convenient place, preferably in the lobby of a theater and included in the lamp circuits are relays or electro-responsive devices 36, 37, 38 which are arranged in series and are included on the negative side of the circuit. These electro-responsive devices control the indicator 35 and each electro-responsive device comprises a magnetic core and an armature 39. The conductor 21 is connected with the wiring of the cores and also to a contact 40 with which the armature 39 coöperates, when the electro-responsive device is energized. Each of the armatures is connected by means of a conductor 41 with one side of the lamps in the indicator 35, and the other side of the lamps is connected by means of a conductor 42 with the conductor 18. Thus it will be manifest that when one of the electro-responsive devices is energized, the armature 39 thereof will be moved into engagement with the contact 40 to complete the circuit through the conductor 41 through the particular lamp in the indicator 35 and then through the conductor 42 back to the main line 18. A switch device 43 may be provided in the main line for cutting in and out the seat lamps. Obviously as many electro-responsive devices may be employed according to the number of rows of seats.

In operation, when the seat is occupied, the circuit through the lamp 10 and the electro-responsive devices will be broken, assuming the switch 43 to be in the position shown in Fig. 1. As soon as the seat is vacated, the make and break devices 16, 19 will be closed and the circuit will be completed through the lamp 10 and electro-responsive devices, as well as the indicator 35 in the following manner, it being understood that as soon as one seat is unoccupied, the current will flow through all of the electro-responsive devices. These electro-responsive devices are, however, of different resistance and are so arranged that when one seat is unoccupied, the circuit although flowing through all of them, will energize only the core of one of the electro-responsive devices sufficiently to attract its armature and when two seats are unoccupied, the current will be of such a strength as to energize the cores of two of the electro-responsive devices to also attract their armatures and so on.

The current, upon the closing of the make and break device, will flow through the conductor 21 through the coils of the electro-responsive devices 36, 37, 38, through the conductor 21ª, thence to the conductor 20 through the contact 19, contact 16, conductor 15, lamp 10, conductor 17, conductor 18 and to the other side of the line. As the current flows through the electro-responsive device 36, assuming one seat to be unoccupied, the armature will be attracted by the core until the armature establishes an operative relation with the contact 41, and the current flowing through the conductor 21 will divide, and a portion thereof will pass through the conductor 40ª which connects the contacts 40, armature 39, conductor 41, to one side 44 of the respective light in the indicator 35, out through the other side 45 of the light, to the conductor 42 and thence back to the conductor 18 on the other side of the circuit. Thus it will be manifest that not only the light which is arranged at the end seat of the particular row will be lighted, but the particular light in the indicator 35 will also be lighted, thereby indicating that one seat in that particular row or section is vacant. Likewise, when two or more seats are unoccupied, the respective lights in the indicator will be lighted as will also the particular lights 10 at the end of the row. Obviously any other form of make and break device may be employed and many changes may be made in the details of construction without departing from the spirit of this invention.

The conductors 15 are preferably arranged in cable form, and by connecting the lamps 10 in the manner specified, the amount of wiring can be materially reduced.

What is claimed as new is:—

1. An electrical indicator for seats, embodying a plurality of signal lights, light circuits, a series of relays included in the circuits of the lights, an indicator controlled by each relay, a seat individual to the signal lights, said seats having raising and lowering movements, and means responsive to the movements of the seats for controlling the respective signal lights and the respective relays.

2. An electrical indicator for seats, embodying a plurality of electric lights, light circuits, a series of electro-responsive devices included in the circuit of the lights, an indicator included in the circuit of each electro-responsive device to be controlled thereby, a seat individual to the electric lights, and means whereby the seat will when occupied extinguish the light and render the respective electro-responsive device inactive, and when unoccupied will light the light and render the respective electro-responsive device active.

3. An electrical indicator for seats, embodying a plurality of electric lamps, lamp circuits, seats individual to the lamps for controlling them, a plurality of relays arranged in series and included in the lamp circuit, to be controlled by the seats, and an indicator individual to the relays.

4. An electrical indicator for seats, embodying a plurality of electric lamps, lamp circuits, seats individual to the lamps for controlling them, a plurality of electro-responsive devices of different resistance arranged in series and included in the lamp circuit, to be controlled by the seats, and indicating means controlled by the said electro-responsive devices.

5. An electrical indicator for seats, embodying an electric lamp adjacent the seats, seats movable upwardly and downwardly, means whereby the movements of the seats will control the respective lamps to designate the unoccupied seats, indicating means disposed remote from the seats, and means embodying a plurality of relays arranged in series and also controlled by the operation of the seats for simultaneously causing the said indicating means to designate the number of unoccupied seats of a predetermined group of seats.

6. An electrical indicator for seats embodying means for locating and designating the particular seat or seats unoccupied, and separate means for designating the number of such unoccupied seats, both of said means being controlled by the operation of the seats, one of said means embodying a plurality of relays arranged in series.

7. An electrical indicator for seats embodying means for locating and designating the particular seat or seats unoccupied, and separate means for designating the number of such unoccupied seats, both of the said means being simultaneously and automatically rendered operative immediately upon the seat becoming vacated and one of the said means embodying a plurality of relays arranged in series.

In testimony whereof I have signed my name to this specification, in the presence of two subscribing witnesses, on this 27th day of May, A. D. 1914.

HARRIS JOHN HANSEN.

Witnesses:
  Mrs. H. E. Baker,
  Elizabeth R. Baker.